United States Patent [19]

Dyko

[11] Patent Number: 5,002,342
[45] Date of Patent: Mar. 26, 1991

[54] BRAKE ASSEMBLY HEAT SHIELD
[75] Inventor: Mark P. Dyko, Akron, Ohio
[73] Assignee: Aircraft Braking Systems Corporation, Akron, Ohio
[21] Appl. No.: 458,201
[22] Filed: Dec. 28, 1989
[51] Int. Cl.$^5$ .......................... F16D 65/78; B60B 19/00
[52] U.S. Cl. ............................. 301/6 WB; 301/6 CS; 188/264 G
[58] Field of Search .................. 301/6 R, 6 WB, 6 A, 301/6 CS; 188/264 G, 71.5, 71.6, 274; 220/435, 436, 438, 439, 440; 165/41, 81, 135, 136

[56] References Cited

U.S. PATENT DOCUMENTS

| | | | |
|---|---|---|---|
| 3,051,528 | 8/1962 | Rogers | 301/6 CS |
| 3,282,011 | 11/1966 | Meserole et al. | 165/135 X |
| 3,913,775 | 10/1975 | Ozaki | 220/436 X |
| 3,958,833 | 5/1976 | Stanton | 301/6 WB X |
| 4,017,123 | 4/1977 | Horner et al. | 188/264 G X |
| 4,084,857 | 4/1978 | VanderVeen | 301/6 A |
| 4,474,404 | 10/1984 | Hagenbuch | 296/184 |
| 4,856,619 | 8/1989 | Petersen | 301/6 WB X |

Primary Examiner—Russell D. Stormer
Attorney, Agent, or Firm—Renner, Kenner, Greive, Bobak, Taylor & Weber

[57] ABSTRACT

A generally cylindrical heat shield is provided for attachment to the wheel of an aircraft for encircling a brake disc stack. The cylindrical shield is configured from a plurality of interleaved arcuate sectors. The sectors are interconnected by means of a slip joint which allows each of the sectors a degree of lateral or circumferential movement with respect to each other to accommodate thermal expansion and contraction. Each of the sectors includes a plurality of layers, typically a pair of outer skins having an inner layer therebetween. A spaced relationship between the skins and the inner layer is maintained by spacers which laterally engage the skins, holding them in fixed spaced relationship, while allowing lateral movement at the spacers to accommodate thermal expansion and contraction. The inner layer is maintained in positional relationship with respect to the skins by spacers in one embodiment, or by detents in the skins engaging the layer in another.

23 Claims, 2 Drawing Sheets

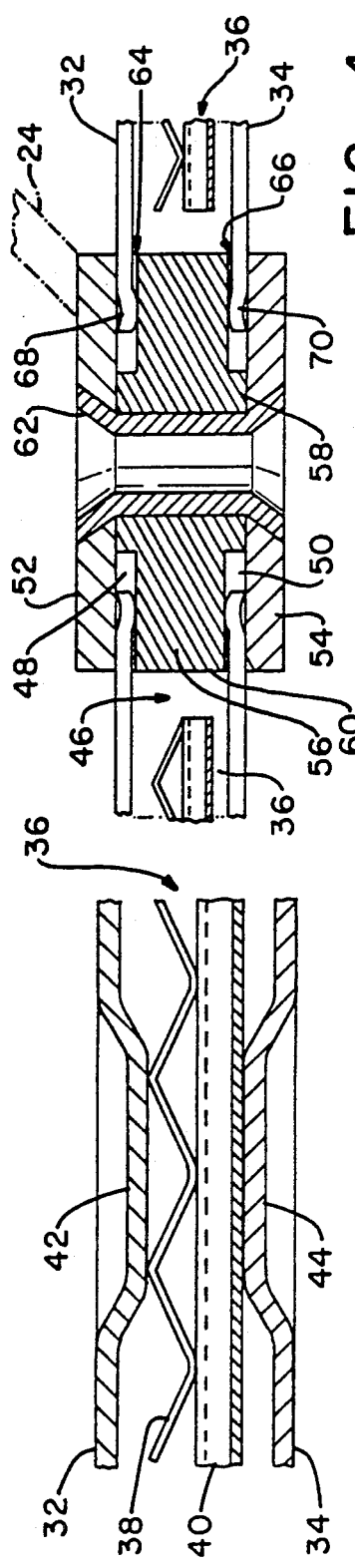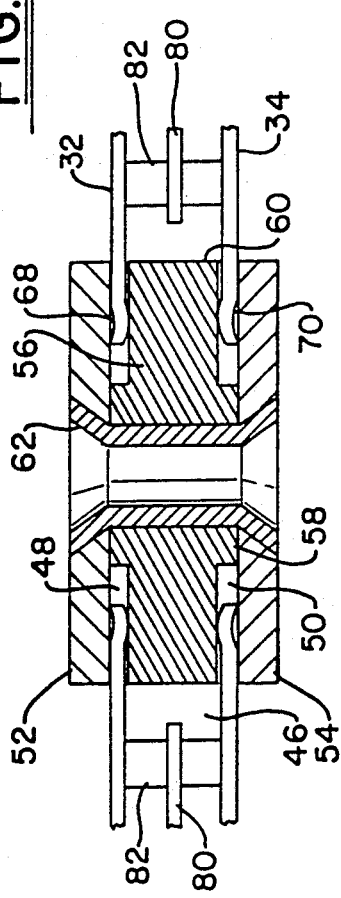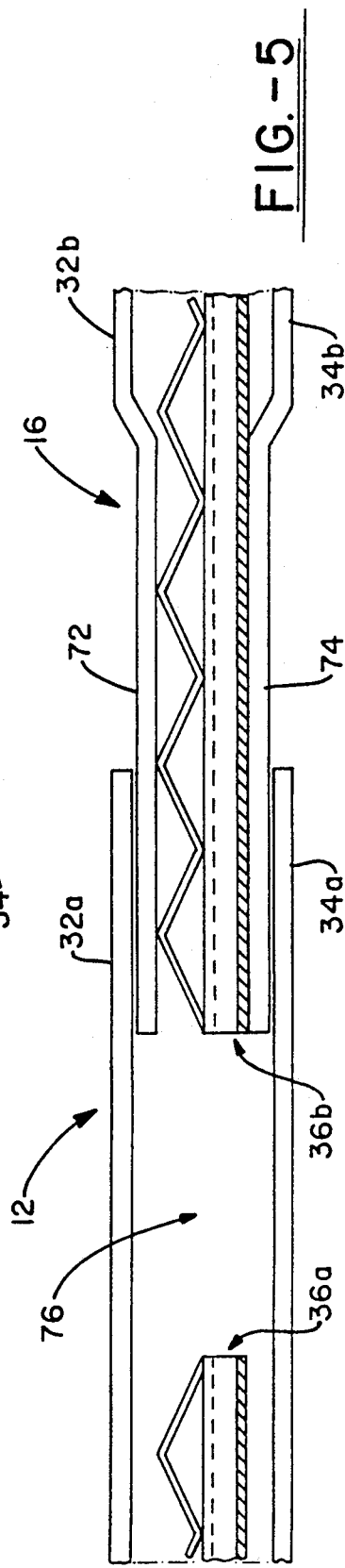

BRAKE ASSEMBLY HEAT SHIELD

TECHNICAL FIELD

The invention herein resides in the art of aircraft braking systems and, more particularly, to a heat shield construction for placement between a brake disc stack and associated wheel of the aircraft. Specifically, the invention relates to a segmented, multi-layered, full circle heat shield to circumferentially encase a brake disc stack.

BACKGROUND ART

It is well known that aircraft braking systems typically comprise a plurality of discs alternately connected to the wheel and axle of the aircraft. The urging together of this cylindrical stack of discs achieves the braking function. In doing so, however, a great deal of heat is generated, particularly in the carbon discs presently used in aircraft. Because of this intense heat, there is a need to shield the wheel, brake components, landing gear components, and other structure of the aircraft to prevent damage, fatigue and the like. Heat shields have been provided to either encase the brake disc stack or to selectively shield aircraft components from the stack. The implementation of such shields has met with a reasonable degree of success.

Known prior art wheel heat shields are typically of metal fabrication, configured into cylindrical or tubular members to be received over the brake disc stack. Typically, the heat shields are multi-layered, comprising between two and four concentrically spaced cylindrical elements. Generally, the greater the number of layers or cylindrical elements comprising the shield, the better the insulation and shielding provided by the unit. Indeed, insulation materials are sometimes substituted for the inner metal layers. However, as the number of layers of cylindrical members increases, the temperature gradient through the thickness of the shield increases. It is elementary that the inner layers, closest to the brake disc stack, are subjected to a greater temperature increase than the other layers of the shield. Accordingly, expansion of the inner layers exceeds that of the outer layers and, with such layers being fixedly interconnected, cracking, warping, and distortion of the heat shield results, giving rise to safety considerations, reduced efficiency, and increased maintenance costs. In other words, since the temperature gradient through the thickness of the heat shield varies from the inner surface to the outer surface of the shield, the thermal forces on the heat shield also vary through its thickness, resulting in the problems aforesaid. Most particularly, problems arise at the points of interconnection of the various layers of the heat shield due to relative expansion caused by heat transfer and dissipation. Since the prior art has taught that the heat shield should be fixedly secured together and also fixedly secured to the wheels, there has been provided no means for accommodating relative movement between the layers or to accommodate expansion and contraction of the heat shield as a whole to eliminate the distortion and fatigue inherent in such rigid systems.

There is a need in the art for a heat shield which allows for relative movement between the various layers of the heat shield itself, while also accommodating lateral expansion and contraction of the heat shield as a unit, without introducing failure or fatigue.

DISCLOSURE OF INVENTION

In light of the forgoing, it is a first aspect of the invention to provide a wheel heat shield which is multi-layered.

Another aspect of the invention is the provision of a wheel heat shield which is circumferentially segmented.

Still a further aspect of the invention is to provide a wheel heat shield in which plural layers are movable with respect to each other to accommodate expansion and contraction thereof.

Yet a further aspect of the invention is the provision of a wheel heat shield in which plural segments are movable relative to each other and also the wheel and are interconnected by a slip joint.

A further aspect of the invention is the provision of wheel heat shield which is simple in construction, cost effective in manufacture, and durable and reliable in operation.

The forgoing and other aspects of the invention which will become apparent as the detailed description proceeds are achieved by a heat shield for a wheel, comprising: a cylindrical member formed from a plurality of arcuate sectors, each said arcuate sector being interleaved with an adjoining arcuate sector to accommodate relative movement therebetween.

Other aspects of the invention are attained by a heat shield for a wheel, comprising: a plurality of concentric cylindrical members; and means interconnecting said plurality of concentric cylindrical members in fixed spaced apart relationship to each other, said means accommodating lateral movement of said cylindrical members due to thermal expansion and contraction.

DESCRIPTION OF DRAWINGS

For a complete understanding of the objects, techniques and structure of invention, reference should be made to the following detailed description and accompanying drawings wherein:

FIG. 3 is a partial sectional view of the heat shields of FIGS. 1 and 2, showing the multiple layering thereof;

FIG. 4 is a partial sectional view of a spacer according to the invention shown interconnecting the inner and outer layers of the heat shield;

FIG. 5 is a partial sectional view of the interleaved connection joint of the sectors of the heat shield of the invention; and FIG. 6 is a partial cross sectional view of an embodiment of the heat shield of the invention wherein spacers separate the inner layers thereof from the outer shield portions.

BEST MODE FOR CARRYING OUT THE INVENTION

Figure 1:
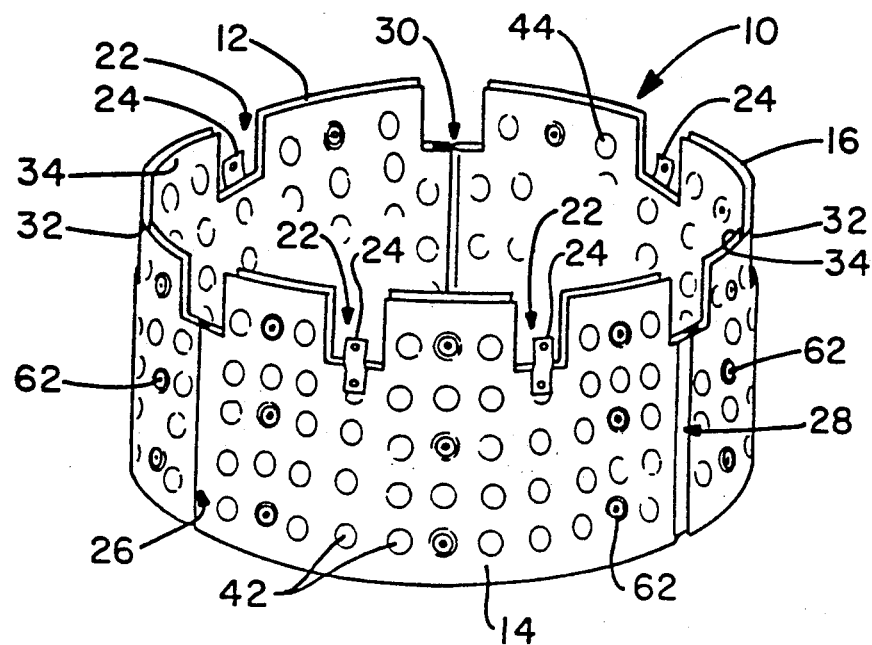
FIG. 1 is a perspective view of a wheel heat shield according to the invention.
Figure 2:
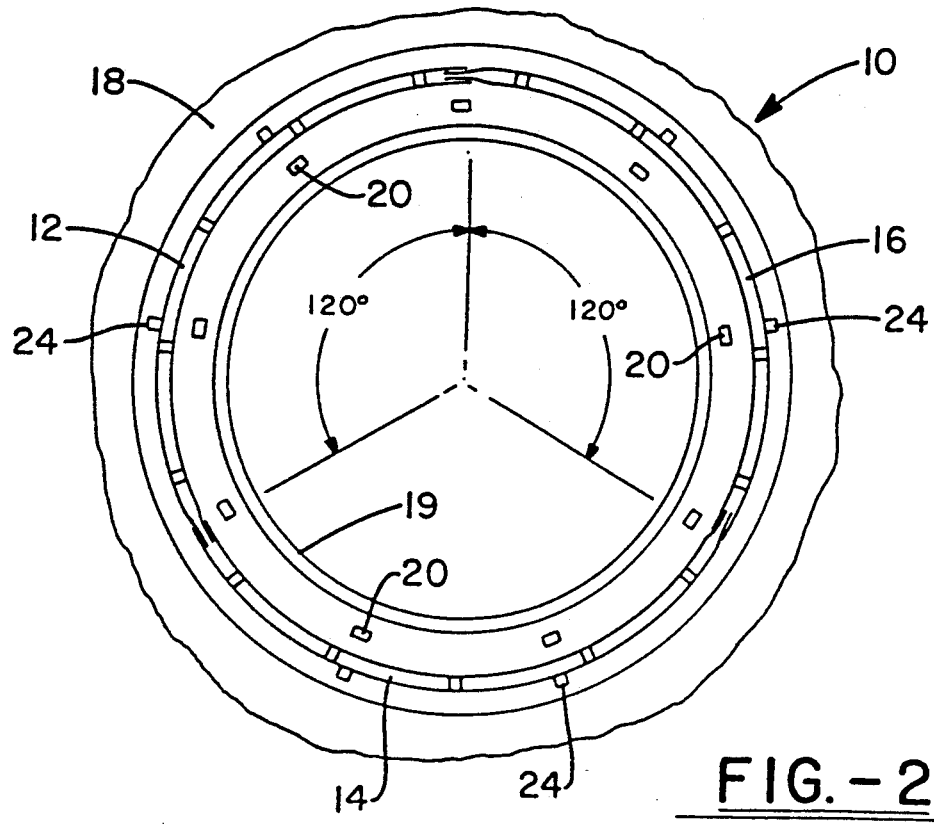
FIG. 2 is an illustrative top plan view of the heat shield of FIG. 1 received and extending from an aircraft wheel.

Referring now to the drawings and more particularly FIGS. 1 and 2, it can be seen that a heat shield according to the invention is designated generally by the numeral 10. As shown, the heat shield 10 is generally cylindrical or tubular in shape and is comprised of a plurality of sectors 12, 14, 16 which are arcuate in nature and interleaved with each other in a manner to be described hereinbelow. Obviously, the radius of curvature of the sectors 12–16 is equivalent to the radius of the cylindrical shield 10. While it is shown that three sectors 12-16 comprise the totality of the cylinder of the heat shield 10, each forming an arc of 120°, it will be appreciated that various numbers of such sectors could be employed for achieving the purposes of the invention.

As shown in FIG. 2, the heat shield 10 is adapted to be received within an aircraft wheel 18 and over an aircraft brake 19, shown illustratively in the drawing. A plurality of keys 20 extend from the wheel 18 in registration with cutouts or windows 22 intersecting a peripheral edge at an open end of the cylinder 10. Mounting brackets 24, appropriately attached to the heat shield 10, extend into alignment with the windows 22 for making securing interconnection with the keys 20 of the wheel 18 as by rivets or the like. It will be appreciated that, while windows are shown as intersecting the points of interconnection of the sectors 12-16, no mounting brackets 24 are presented at such windows, but only at windows totally within a sector and not spanning a pair of sectors. This arrangement allows for the necessary relative circumferential or lateral movement of the sectors 12-16 with respect to each other, unimpeded by fasteners securing the mounting brackets. As is apparent from FIGS. 1 and 2, and as will be presented in detail below, the arcuate sectors 12-16 are interleaved with adjoining sectors as at 26, 28, 30. In effect, the interconnections 26-30 comprise slip joints allowing for circumferential or lateral expansion and contraction of the various sectors with respect to each other without buckling or distortion.

With reference now to FIG. 3, it can be seen that in a preferred embodiment of the invention the sectors 12-16 of the heat shield 10 are each comprised of an external skin 32 and an internal skin 34, named to designate the positional relationships of the skins with respect to the brake discs stack, the external skin 32 being furthest from the stack, and the internal skin 34 being closest to it. An inner layer 36 is maintained between the pair of skins 32-34 to provide further thermal shielding and insulation. It will be appreciated that the inner layer 36 may be of any various configurations such as the pair of corrugated metal sheets 38-40 of FIG. 3. In this embodiment of the invention, the corrugations of the respective sheets 38-40 are orthogonal to each other, one having circumferential corrugations and the other having axial corrugations when considered with respect to the heat shield 10 as a whole. It will, of course, be appreciated that a single inner layer may be provided or, indeed, no inner layer at all may be required. It is also contemplated that a non-metalic insulating material such as ceramic or the like may be employed for the inner layer or layers. The determination of the existence and/or nature of any inner layer is dependent upon the heat shielding and dissipation required.

As shown in FIGS. 1 and 3, the external skin 32 and the internal skin 34 are provided with respective dimples or detents 42, 44. These detents are imposed in the respective skins to a controlled depth and opposite each other such that the distance defined therebetween is substantially equivalent to the thickness of the inner layer 36. Accordingly, the inner layer 36 may be frictionally engaged between the pair of skins 32, 34. It will further be appreciated that the contacting relationship of the elements 32, 34, 36 provides for minimal heat transfer and dissipation, to maximize shielding.

While the specific structure and configuration of the heat shield 10 may vary as a function of heat shielding requirements, the structural interrelationships of the preferred embodiment of the invention as shown in FIG. 3 will be given. It will be appreciated that the elements 32, 34, 38, 40 are preferably of stainless steel construction, for anti-corrosion and durability considerations. The skin 32, 34 preferably have a thickness on the order of 0.015 inch, while the thickness of the corrugated sheets 38, 40 is on the order of 0.007 inch. The corregated sheets each have a thickness on the order of 0.03 inch, while the detents extend inwardly on the order of 0.02 inch each.

It is important that the various layers of the heat shield 10 be maintained in a fixed relationship with each other, while accommodating relative movement of one layer with respect to the other due to thermal expansion and contraction or the like. To accommodate this feature, the structure of FIG. 4 is employed. As shown, substantially concentrically aligned circular holes 46, 48, 50 are respectively introduced through the inner layer 36, external skin 32, and internal skin 34. As shown in the drawing, the holes 48, 50 in the external and internal skins 32, 34 are preferably of the same diameter, the same being smaller than the diameter of the hole 46 passing through the corrugated sheets 38, 40 of the inner layer 36. A pair of washers 52, 54 receive therebetween a spacer 56 in the configuration of an annular disc having a collar 58 and an extending flange 60. As shown, the collar 58 abuts the washers 52, 54 and maintains those collars in fixed separation with respect to each other by a distance determined by the height of the collar. The flange 60 is centered axially on the collar 58, but has a height less than that of the collar 58 such that a clearance is defined between the flange 60 and the washers 52, 54 as shown. It will be appreciated that the diameter of the flange 60 is substantially equivalent to that of the washers 52, 54, with the diameter of the collar 58 being substantially less than such diameter, defining the clearances just described. A rivet or other appropriate fastener 62 passes through center holes in washers 52, 54 and spacer 56 to secure them as shown. Of course, the washers 52, 54 can be counterbored to receive the rivet.

The clearances 64, 66 between the washers 52, 54 and extending flange 60 form a pair of circular slots adapted for respectively receiving the pair of skins 32, 34. It will be appreciated that the diameter of the holes 48, 50 is greater than the diameter of the collar 58 to provide a clearance in the slots 64, 66 for expansion, contraction, and movement of the skins 32, 34. In a preferred embodiment of the invention, the difference in the diameter of the collar 58 and holes 48, 50 is on the order of 0.08 inch. Similarly, the diameter of the flange 60 is less than the diameter of the hole 46 in the inner layer 36 to provide a clearance for expansion and contraction of that inner layer. Again, in a preferred embodiment of the invention the diameter difference is on the order of 0.08 inch.

There is generally provided a friction fit between the skins 32, 34 and the washers and collar 52, 54, 60. While the width of the slot 64, 66 is greater than the thickness of the skins 32, 34, frictional engagement is achieved by crimping the inner edges of the skin 32 about the hole 48 as shown at 68. Similarly, a crimp 70 is interposed at the circumferential edge of the skin 34 at the hole 50. The crimped edges 68, 70 distort the thickness of the skins 32, 34 to be substantially equal to the clearance of the circular slots 64, 66 to obtain the desired friction fit. It will be appreciated by those skilled in the art that when the thermal expansion or contraction forces in either of the skins 32, 34 exceeds the frictional forces of the engagement of the respective crimped edges 68, 70 with the slots 64, 66, the skin will laterally expand into the respective slot without buckling or the like. In similar fashion, when the thermal expansion or contraction forces on the inner layer 36 exceed the frictional forces imparted at the detents 42, 44, lateral movement of the inner layer 36 with respect to the skins 32, 34 is possible, the same being achieved without buckling or distortion.

With continued reference to FIG. 4, it can be seen that a mounting bracket 24 is shown in phantom as extending from the washer 52. It will be appreciated that the mounting brackets 24, adapted for interconnection with the wheel keys 20 or directly to the wheel 18, may be mounted using the spacer as shown in FIG. 4, the same thus serving the dual purpose of mounting the heat shield 10 to an associated wheel to encompass an associated brake disc stack, while maintaining the heat dissipating elements of the shield 10 in fixed relationship to each other while accommodating thermal expansion and contraction.

The structure just described with respect to FIG. 4 allows for relative lateral or circumferential movement of the various skins and inner layers with respect to each other. It is also important that the various sectors 12, 14, 16 be so interconnected that lateral or circumferential movement between the sectors may also be accommodated without warping, fracture or fatigue. To this end, FIG. 5 shows a type of slip joint interconnection between the sectors 12, 16 of FIGS. 1 and 2. As shown, a lateral edge of the sector 16 is crimped or collapsed to substantially decrease the thickness of the assembly to equal that at the detents 42, 44 as shown in FIG. 3. Accordingly, a lip is defined by the lateral edges 72, 74 and is formed by crimping respective skins 32b and 34b. The lateral edges 72, 74 are crimped or collapsed upon the inner layer 36b as shown. At this edge of the sector 16, the inner layer 36b is coextensive with the lateral edges 72, 74, such structure defining a male portion of the slip joint under consideration.

As shown, the sector 12 has an outer skin 32a and an inner skin 34a, sandwiching an inner layer 36a therebetween. As shown, the inner layer 36a does not extend to the lateral edge of the skins 32a, 34a, but allows for an expansion clearance area 76 therebetween. This expansion clearance 76 is substantially equal to the length of the area of the collapsed lateral edges 72, 74. It will be appreciated that the expansion clearance 76 defined between the skins 32a, 34a establishes the female portion of the slip joint. In assembly, the lateral edges 72, 74 are received within the expansion clearance 76 between the skins 32a, 34a and are maintained therein by secured engagement of the mounting brackets 24 of the associated arcuate sector with the keys 20 of the wheel or the wheel 18 itself. Thermal expansion, contraction, and other movement is thus accommodated by the expansion clearance 76 at the slip joint without buckling, warping, or other degradation of the heat shield 10.

With reference now to FIG. 6, a slight variation on the theme of the invention can be seen. Again, a pair of skins 32, 34 are received by a retainer comprising a pair of washers 52, 54 with a spacer 56 therebetween. The difference in the configuration of the heat shield fabricated according to this structure and that earlier presented resides in the construction of the inner layer 80 which, in this case, constitutes either single or multiple flat sheets of stainless steel 80 interposed between the skins 32, 34. No detents or the like are provided in the skins 32, 34, such that the spacers 82 may be placed throughout the assembly and interposed between the inner layer 80 and the outer skins 32, 34 to maintain the desired fixed spatial relationship. In the preferred embodiment, the spacers 82 would be fixedly secured to the inner layer 80 and in frictional contacting engagement with the skins 32, 34. Accordingly, when the thermal expansion or contraction forces exceeded the frictional force between the spacers 82 and skins 32, 34, the elements 32, 34, 80 can then move relative to each other to accommodate such expansion and contraction. Of course, the spacers 82 may be fixed to inner surfaces of the skins 32, 34 and be in frictional engagement with the inner layer 80 to achieve the same result.

It should now be readily apparent that a heat shield has been provided for a brake disc stack in which a cylindrical member is mounted to an aircraft wheel and extended over the stack to shield the remainder of the aircraft from the heat generated thereat. The heat shield consists of a plurality of interleaved arcuate sectors, each of which may be developed from multi-layered metallic sheet construction. Interconnections between the various sheets to maintain a desired spaced relationship are provided with clearances to accommodate lateral thermal expansion and contraction between the various layers. Indeed, such clearances accommodate different amounts of expansion and contraction between the layers, thus providing for a temperature gradient throughout the shield itself. In like manner, a slip joint interconnection of the various sectors of the heat shield accommodates thermal movement of the sectors with respect to each other.

Thus it can be seen that the objects of the invention have been satisfied by the structure presented above. While in accordance with the patent statutes only the best mode and preferred embodiments of the invention have been presented and described in detail, it is to be understood that the invention is not limited thereto or thereby. Accordingly, for an appreciation of the true scope and breadth of the invention reference should be made to the following claims.

What is claimed is:

1. A heat shield for a wheel, comprising:
a cylindrical member formed from a plurality of arcuate sectors, each said arcuate sector being interleaved with an adjoining arcuate sector to accommodate relative movement therebetween and wherein lateral ends of each of said arcuate sectors engage lateral ends of adjoining arcuate sectors.

2. The heat shield according to claim 1, wherein edges of said cylindrical member are characterized by windows having mounting brackets extending thereinto for engagement of a wheel.

3. The heat shield according to claim 1, wherein each sector is multilayered.

4. The heat shield according to claim 1, wherein each sector comprises a pair of skins substantially parallel to each other.

5. The heat shield according to claim 4, wherein a first lateral edge of each said sector has an outside thickness and a second lateral edge of each said sector has an inside separation, said outside thickness being less than said inside separation, a first lateral edge of each said sector being received within said inside separation between said pair of skins at said second lateral edge of an adjoining sector.

6. The heat shield according to claim 4, wherein an intermediate material is positioned between said pair of skins.

7. The heat shield according to claim 6, wherein said intermediate material comprises a sheet of material in contacting engagement with said pair of skins at particular points on said sheet.

8. The heat shield according to claim 7, wherein said skins are characterized by plurality of detents in contacting engagement with said sheet of material.

9. The heat shield according to claim 6, wherein a plurality of spacers are interposed between said sheet of material and said pair of skins, maintaining said sheet of material in spaced apart relation to said pair of skins.

10. The heat shield according to claim 4, wherein said pair of skins are held in spaced apart relationship by spacers received within aligned holes in said pair of skins.

11. The heat shield according to claim 10, wherein a clearance is provided at each said hole between each of said skins and said spacers to accommodate expansion and contraction of said skins.

12. The heat shield according to claim 11, wherein each of said spacers comprises a pair of washers positioned at said holes and having said pair of skins therebetween, said washers being in fixed spaced apart relationship to each other.

13. The heat shield according to claim 12, further comprising an annular disc having a collar in separating engagement with said washers, and a flange extending from and encircling said collar, said flange defining a pair of passages with said pair of washers, said passages receiving said pair of skins.

14. The heat shield according to claim 13, wherein circumferential edges of each of said pair of skins about said holes are crimped to frictionally engage said washers and said flange.

15. The heat shield according to claim 11, further comprising an intermediate sheet of material in spaced apart relationship with said pair of skins and frictionally maintained therebetween.

16. The heat shield according to claim 15, wherein said intermediate sheet of material has holes passing therethrough substantially concentric with said aligned holes of said pair of skins.

17. The heat shield according to claim 16, wherein said holes of said intermediate sheet are of larger a diameter than said holes of said pair of skins, said spacers passing through associated sets of holes in said intermediate sheet and said pair of skins.

18. The heat shield according to claim 17, wherein a clearance between said spacers and said holes of said intermediate sheet accommodate expansion and contraction of said intermediate sheet.

19. A heat shield for a wheel, comprising:
a plurality of concentric cylindrical members; and
means interconnecting said plurality of concentric cylindrical members in fixed spaced apart relationship to each other, said means accommodating lateral movement of said cylindrical members due to thermal expansion and contraction.

20. The heat shield according to claim 19, wherein said means comprises a spacer passing through substantially concentric holes in said cylindrical members.

21. The head shield according to claim 20, wherein a radial clearance is provided between each of said holes and said spacer passing therethrough.

22. The heat shield according to claim 21, wherein said spacer frictionally engages certain of said cylindrical members.

23. The heat shield according to claim 22, wherein said plurality of cylindrical members comprises an outer pair of cylindrical members frictionally receiving at least one cylindrical member therebetween.

* * * * *